Sept. 29, 1970 I. M. McNAIR, JR 3,531,598

POLARITY SENSITIVE VOLTAGE INSERTION CIRCUIT FOR LONG SUBSCRIBER LOOPS

Filed Oct. 17, 1967 3 Sheets-Sheet 1

INVENTOR
I. M. McNAIR, JR.
BY Howard R. Popper
ATTORNEY

United States Patent Office 3,531,598

Patented Sept. 29, 1970

3,531,598

POLARITY SENSITIVE VOLTAGE INSERTION CIRCUIT FOR LONG SUBSCRIBER LOOPS

Irving M. McNair, Jr., Colts Neck, N.J., assignor to Bell Telephone Laboratories, Incorporated, Murray Hill and Berkeley Heights, N.J., a corporation of New York Filed Oct. 17, 1967, Ser. No. 675,853

Int. Cl. H04m *19/00*

U.S. Cl. 179—16 15 Claims

ABSTRACT OF THE DISCLOSURE

Circuitry is disclosed whereby a voltage in addition to that of the central office battery may be inserted in high resistance telephone lines, particularly those employed in step-by-step central offices which employ reverse battery signaling. The circuitry senses the instantaneous polarity of the central office battery and inserts the additional voltage in the line with the proper polarity so as to increase the applied potential to the line.

BACKGROUND OF THE INVENTION

This invention relates to the transmission of telephone signals over subscriber loops and, more particularly, to increasing the loop range over which such signals may be effectively transmitted.

The transmission range of conventional telephone loop circuits is limited by attenuation of the transmitted signal level. If the loop is particularly long, the signals may be so attenuated that they are no longer useful for their intended purpose. Attenuated dial pulses may give rise to dialing errors and speech transmission may be degraded to the point where conversation is impossible. To prevent excessive attenuation, either larger gauge wires must be used or else additional central offices must be provided to serve a given area. If, somehow, the serviceable range of the subscriber's loop could be extended, significant savings in the gauge of wire and the number of central offices could be achieved.

One of the prior approaches to extending the range involves the use of what is called a dial long line circuit. This apparatus employs a sensitive relay which repeats the loop closure from a telephone set switchhook and is capable of operating on a long subscriber loop with the standard central office battery. The dial long line circuit also requires a repeat coil for transmission and several auxiliary relays for repeating ringing.

An alternative approach which has sometimes been considered is to boost the potential of the central office battery. This approach has not appeared to be desirable in either step-by-step or crossbar offices because too much of the equipment would have to be modified to operate properly at the increased voltage to accommodate the small percentage of high resistance loop circuits. If the additional voltage were provided only for the high resistance lines on a per loop basis, the economic drawbacks would be overcome. A problem would arise, however, in offices employing reverse battery signaling because the additional series battery would subtract from one polarity of the central office battery.

It is therefore an object of the present invention to extend the effective transmission range of subscriber loops.

It is another object of the invention to supply additional sources of potential for long subscriber loops on a per loop basis.

SUMMARY OF THE INVENTION

In accordance with this invention, apparatus for inserting an additional voltage in a subscriber loop to increase the resistance-limited range of the loop is provided on a per loop basis. The additional voltage is inserted with the same instantaneous polarity as that of the central office battery so as to increase the applied potential to the loop no matter what might be the polarity of the central office battery. Embodiments making use of two basic polarity detecting techniques are disclosed, the polarity or the central office battery voltage being sensed directly in some while in the others it is the direction of current flow in the subscriber's loop which is sensed. However, in all embodiments, identical circuits are inserted in series with each conductor of the subscriber's loop. These two identical circuits are directly connected together in the embodiments which sense central office battery voltage polarity but operate independently of each other in the embodiments which sense the direction of current flow.

Both polarity detection embodiments sense the direction of the voltage drop across a resistor. The current sensing embodiments provide a resistor in series with the loop. When current flows in the loop, the direction of the voltage drop across the resistor determines which of complementary semiconductor switching devices are turned on. In the polarity sensing embodiments, the direction of the voltage drop across a resistor shunting the loop is detected, and determines which of complementary semiconductor switching devices are to be turned on. Oppositely-poled sources of potential are included in each of the identical circuits, each of the complementary semiconductor switching devices being associated with one of these oppositely-poled sources of potential and, when turned on, causing its associated source of potential to be inserted in series with the subscriber's loop. The sources of potential within each circuit are poled so as to increase the potential applied to the loop, the voltage of the central office battery being greater than the total of the additional potential sources inserted in the loop so that it alone controls the polarity of the voltage applied increase the potential applied to the loop.

Accordingly, a feature of the present inventiton is a voltage insertion range extender circuit which is responsive to the polarity of the central office battery for inserting a source of potential in a subscriber's loop so as to increase the potential applied to the loop.

DESCRIPTION OF THE DRAWING

The foregoing and other objects and features may become more apparent by referring now to the drawing in which.

GENERAL DESCRIPTION

Figure 1:
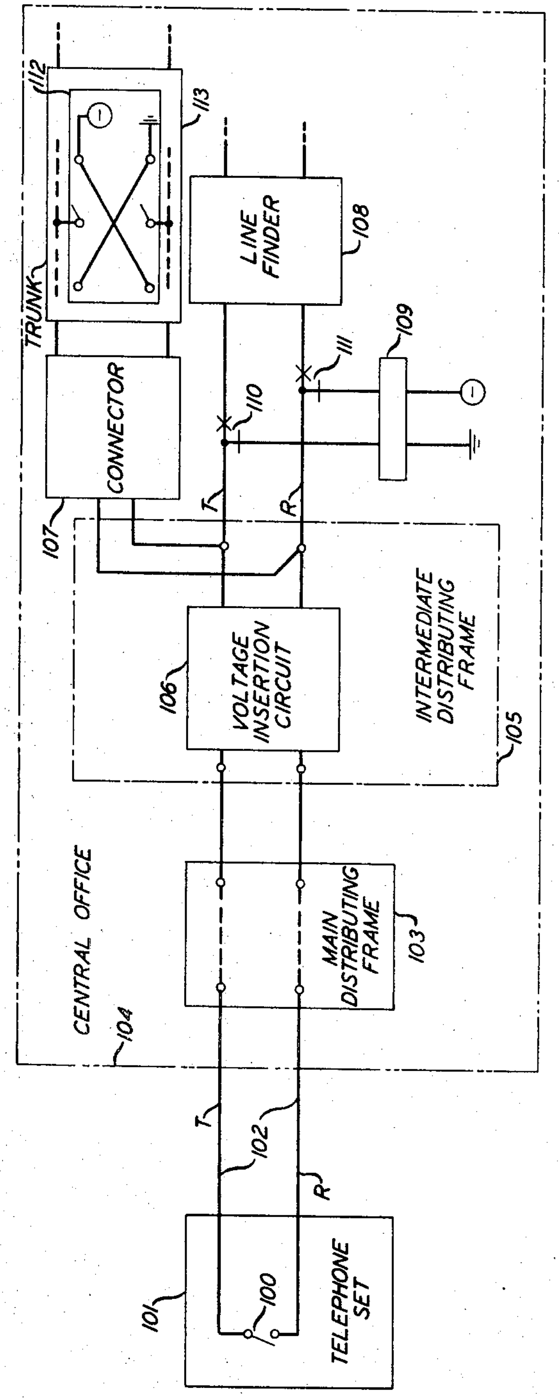
FIG. 1 shows the voltage insertion circuit of the present invention installed in a step-by-step central office having high resistance telephone loops.

In FIG. 1, switchhook 100 of the subscriber's telephone set 101 is shown connected through loop 102 to the main distributing frame 103 of central office 104. The tip and ring conductors T, R of the loop are connected through intermediate distributing frame 105 to the voltage insertion circuit 106. The tip and ring conductors of the loop extend from the right-hand terminals of intermediate distributing frame 105 where connection is made to the step-by-step connector 107, line finder 108, and line relay 109. The transfer contacts 110 and 111 are contacts of the line cut-off relay whose winding is not shown.

When the subscriber's telephone 101 is first placed in the off-hook condition, loop 102 is closed permitting current to flow from the central office battery through the right-hand winding of line relay 109 and over the path including the back contact of transfer contacts 111, the ring conductor R extended through the lower part of voltage insertion circuit 106, contacts 100, the tip conductor T extended through the upper part of voltage insertion circuit 106, the back contact of transfer contacts 110, and the left-hand winding of line relay 109 to ground. Line relay 109 thereby operates and one of its work contacts (not shown) starts the line finder 108 in the conventional manner. When line finder 108 finds calling line 102, it operates the cut-off relay (not shown) whose operated back contacts of transfer contacts 110, 111 remove line relay 109 from the circuit. The make contacts of transfer contacts 110, 111 connect the extended tip and ring conductors of loop 102 to the line finder 108. Dial tone is then supplied to loop 102 in the usual manner. On a terminating call to loop 102, ringing is applied to the loop from connector 107. Connector 107 connects the calling party to the loop through trunk 133 after the called party at telephone set 101 answers. Trunk 113 employs reverse battery signaling when the called party answers to change the signal toward the calling end from on-hook to off-hook by reversing battery and ground on the tip and ring conductors; the central office reverse battery arrangement 112 is shown in simplified representation in trunk circuit 113.

DETAILED DESCRIPTION

Figure 2:
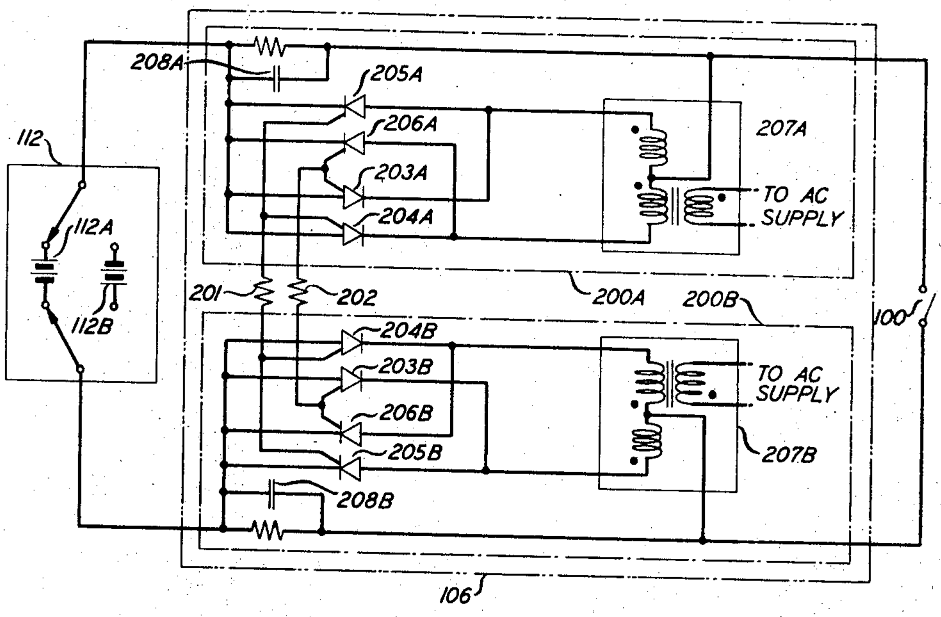
FIG. 2 is a detailed schematic of the two identical halves of a voltage detecting, voltage insertion circuit employing silicon controlled switches.
Figure 3:
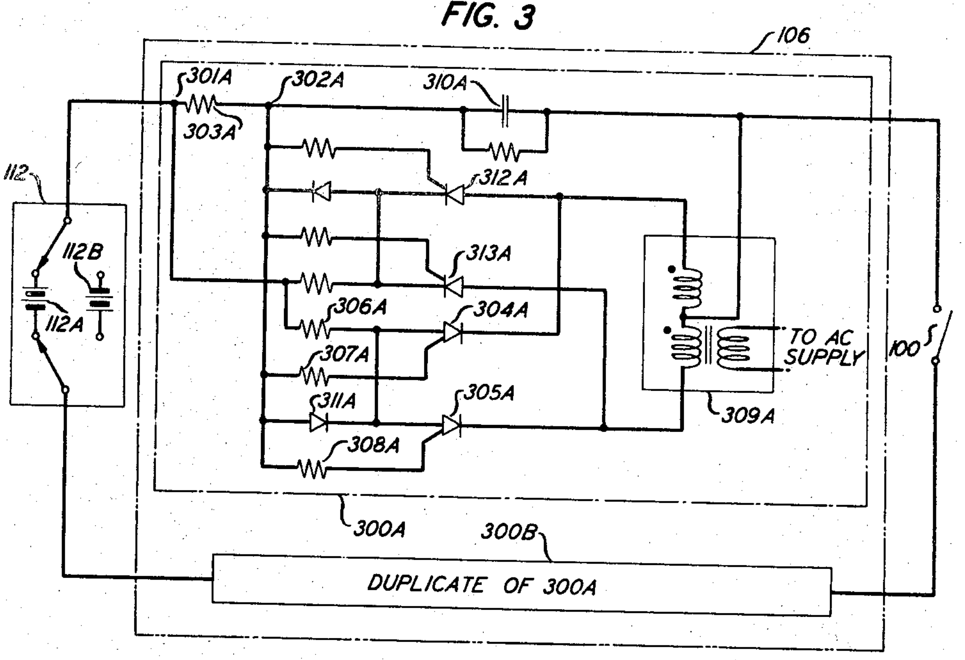
FIG. 3 is a detailed schematic of one of the two identical halves of a current detecting, voltage insertion circuit employing silicon controlled switches.
Figure 4:
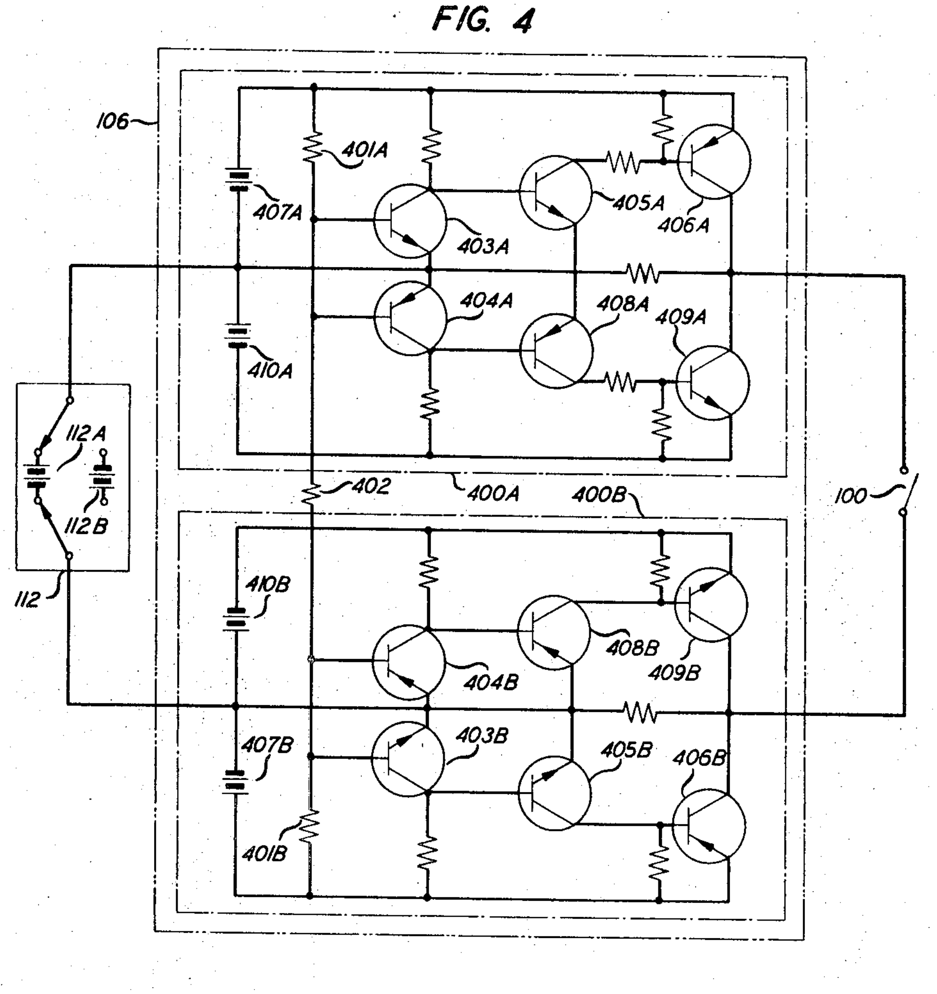
FIG. 4 is a detailed schematic of the two identical halves of a voltage detecting, voltage insertion circuit employing transistors.
Figure 5:
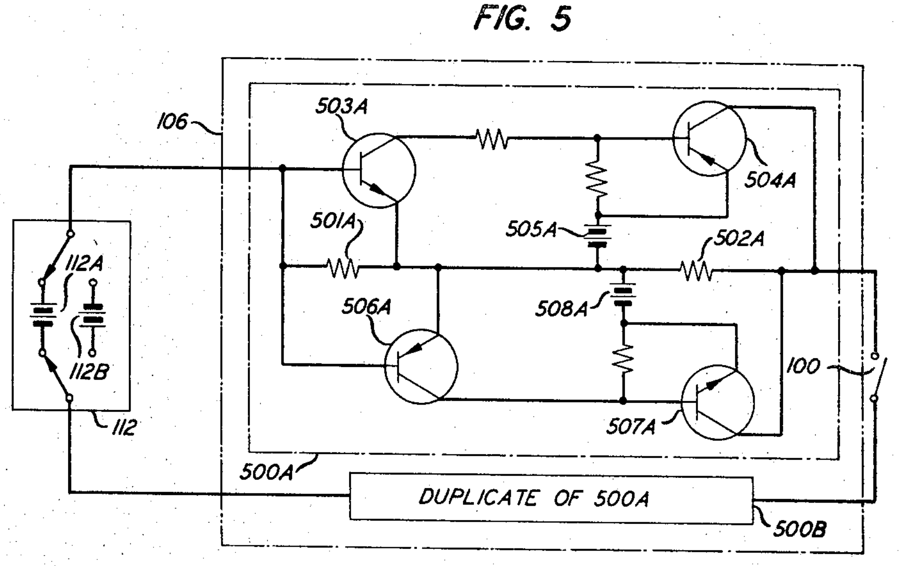
FIG. 5 is a detailed schematic of one of the two identical halves of a current detecting, voltage insertion circuit employing transistors.

In FIGS. 2 through 5 details of the different embodiments of voltage insertion circuit 106 are shown in relationship to the subscriber's loop 102 and a simplified representation of a central office reverse battery signaling arrangement 112. In FIGS. 2 and 4, both halves, i.e., 200A, 200B, and 400A, 400B, of the voltage detecting embodiments of the voltage insertion circuit are shown in full detail. In FIGS. 3 and 5, the current detecting voltage insertion circuit embodiments are shown and, for the sake of simplicity, only one of the identical halves, i.e., 300A and 500A, of these respective embodiments are fully detailed. The relative positions of subscriber's switchhook 100 and central office battery 112 have been reversed in FIGS. 2 through 5 with respect to their positions as shown in FIG. 1. This has been done so that the stimulus to the circuitry, i.e., the different polarities of central office battery 112, can be seen at the left and the rest of the circuit operations described in a more or less left-to-right manner, as is customary.

In FIG. 2, the halves 200A and 200B of voltage insertion circuit 106 are interconnected by resistors 201 and 202. In circuit 200A, silicon-controlled switches 203A and 204A constitute a full-wave rectifier whose polarity is opposite to that of the full-wave rectifier made up of silicon-controlled switches 205A and 206A. The input to these rectifiers is the output of transformer 207A and the output of the rectifiers is a voltage which is developed across capacitor 208A. The choice of which rectifier is used to charge capacitor 208A is determined by the polarity of central office battery 112 in a manner to be described herein.

Switches 203A, 204A, 203B, and 204B are complementary devices with respect to switches 205A, 206A, 205B, and 206B. The control junction of the first group of switches is the anode-gate junction and the control junction of the second group is the gate-cathode junction. A positive voltage applied to the control junction of a switch forward biases the junction and turns on the switch. A negative voltage at the control junction reverse biases the junction and keeps the switch turned off. With the polarity of the central office battery 112A as shown, current flows from the positive terminal of battery 112A into the anodes and out of the gates of silicon-controlled switches 203A and 204A, forward biasing the control junctions through resistors 201 and 202, into the gates and out of the cathodes of silicon-controlled switches 205B and 206B, forward biasing the control junctions, and then to the negative terminal of central office battery 112A, turning on the above-mentioned switches. This polarity of central office battery 112A provides negative gate-to-cathode voltages on switches 205A and 206A and negative anode-to-gate voltages on switches 203B and 204B due to these control junctions being connected in parallel configuration with the control junctions of the turned-on switches, thereby reverse biasing the control junctions and keeping switches 205A, 206A, 203B and 204B turned off. The A–C output of transformer 207A is conducted on alternate half cycles by switches 203A and 204A, which switches are both enabled for the full cycle but each only conducts in one direction, and capacitor 208A is thereby charged through the path consisting of the anode-to-cathode paths of switches 203A and 204A, the secondaries of transformer 207A, and the center-tap lead of the secondary of transformer 207A. The polarity of the charged capacitor 208A is such that the right-hand side of this capacitor is at a more positive potential than the left-hand side of the capacitor. This polarity adds to the potential applied to the loop by central office battery 112A. Capacitor 208B is charged in the same manner from transformer 207B and the left-hand side of capacitor 208B is at a more positive potential than the right-hand side of capacitor 208B. The total voltage applied to the loop is therefore the sum of the central office battery 112A voltage and the voltages on capacitors 208A and 208B. The circuit is arranged so that capacitor 208A, as well as capacitor 208B, is charged to approximately one-half the voltage of central office battery 112A.

If the polarity of the central office battery were reversed so that the battery 112B was connected, current would flow from the positive terminal of battery 112B through the anode-to-gate paths of switches 203B and 204B, through resistors 201 and 202, through the gate-to-cathode paths of switches 205A and 206A, and then to the negative terminal of battery 112B, turning these switches on. The remainder of the operation of the circuit is identical to the operation described for central office battery 112A being connected except that the roles of circuits 200A and 200B are reversed and capacitors 208A and 208B are charged in the opposite direction.

In FIG. 3 is shown a circuit employing silicon-controlled switches which is operable only when current flows in the loop. With the central office battery 112A polarity as shown, loop current flow causes node 301A to be at a higher potential than node 302A, the difference being the voltage drop across resistor 303A. This potential difference forward biases the anode-to-gate junctions of switches 304A and 305A through resistors 306A, 307A, and 308A, thereby turning on switches 304A and 305A. Switches 304A and 305A act as a full-wave rectifier and conduct the output of transformer 309A on alternate half-cycles. Capacitor 310A is thus charged alternately through the path consisting of diode 311A, switch 304A, and the upper half of the secondary of transformer 309A, and the path consisting of diode 311A, switch 305A, and the lower half of the secondary of transformer 309A. This charging causes the right-hand side of capacitor 310A to be at a higher potential than the left-hand side, thereby increasing the potential applied to the loop. While switches 304A and 305A conduct, diode 311A is forward biased due to the current charging capacitor 310A. This tends to reverse bias switches 304A and 305A during the conducting state but resistors 307A and 308A limit the reverse current sufficiently so that switches 304A and 305A will not turn off until the anode current drops to essentially zero. The circuit of FIG. 3 is arranged so that the total additional voltage applied to the loop, which is the sum of the voltage on capacitor 310A and capacitor 310B in circuit 300B, is less than the voltage of central office battery 112 so that the direction of current flow is always determined by the polarity of central office battery 112.

For a current flow in the loop in the reverse direction to that described above, caused by battery 112B being connected in the loop, switches 312A and 313A conduct on alternate half cycles of the A-C supply to charge capacitor 310A in the opposite polarity. This circuit action is essentially similar to that described before, and hence a description need not be repeated herein. The identical operation of circuit 300B should also be understood.

FIG. 4 depicts the illustrative embodiment employing transistors and controlled by the polarity of central office battery 112. For the central office battery 112A polarity as shown, current flows from the positive terminal of battery 112A through battery 407A, through resistors 401A, 402, and 401B, and through battery 407B to the negative terminal of battery 112A. This current is sufficient to reverse bias and keep turned off transistor 403A and to forward bias transistor 404A into saturation. Transistor 405A is turned on when transistor 403A is turned off, driving transistor 406A into saturation, thereby connecting battery 407A in series with the line. With transistor 404A in saturation, transistors 408A and 409A are nonconducting. The circuit is complementary so that with central office battery 112B connected, transistors 403A, 408A, and 409A are driven into saturation, transistors 404A, 405A, and 406A are nonconducting, and battery 410A is inserted in series with the line. Circuit 400B operates in exactly the same manner and inserts battery 410B whenevery battery 407A is inserted by circuit 400A and inserts battery 407B whenever battery 410A is inserted by circuit 400A.

The current-sensing circuit employing transistors is depicted in FIG. 5. The illustrative polarity of central office battery 112A causes current to flow through resistor 501A and then through resistor 502A when the loop is completed by the closure of subscriber's switchhook 100. A voltage is developed across resistor 501A so as to forward bias transistor 503A and draw sufficient current to drive transistor 504A into saturation. This places battery 505A across resistor 502A so that it is series adding with respect to central office battery 112A. If the polarity of central office battery 112 were reversed by connecting battery 112B in the loop, transistors 506A and 507A would conduct and battery 508A would be inserted in the line so as to add to the polarity of central office battery 112B. Batteries 505A and 508A are each less than one-half the magnitude of central office battery 112 so that when added to the corresponding batteries in circuit 500B, which circuit operates identically, they are still not able to override the current direction control of central office battery 112.

It is understood that the above-described arrangements are merely illustrative of the application of the principles of this invention. Numerous other arrangements may be devised by those skilled in the art without departing from the spirit and scope of this invention.

What is claimed is:

1. An arrangement for increasing the effective transmission range of a telephone subscriber's loop comprising detector means for detecting instantaneous polarities of a central office battery on said loop, first means activated by said detector means detecting a first instantaneous polarity of said battery for inserting a first source of potential in said loop to add to the potential of said battery, and second means activated by said detector means detecting a second instantaneous polarity of said battery for inserting a second source of potential in said loop to add to the potential of said battery, whereby said first and second sources and said battery increase the effective transmission range of said loop for both said first and second battery polarities.

2. An arrangement for increasing the effective transmission range of a telephone subscriber's loop in accordance with claim 1 wherein said first and second potential source inserting means include a common capacitor and individual rectifier means controlled by said detector means for selectively charging said capacitor.

3. An arrangement for increasing the effective transmission range of a telephone subscriber's loop in accordance with claim 2 wherein said rectifier means includes semiconductor switches each having an anode, a cathode and a gate and wherein said detector means includes the gates of said switches, the anode and cathode of each of said switches being included in a path for charging said capacitor, and the gate of each of said switches being connected to said subscriber's loop and poled to receive current from a respective polarity of said central office battery applied to said loop.

4. An arrangement for increasing the effective transmission range of a telephone subscriber's loop in accordance with claim 1 wherein said first and second potential source inserting means each includes a source of potential, first transistor means for inserting said source of potential in series with the central office battery and the subscriber's loop, and said detector means includes second transistor means for enabling said first transistor means dependent on the instantaneous polarity of the central office battery.

5. An arrangement for increasing the effective transmission range of a telephone subscriber's loop comprising detector means for detecting instantaneous polarities of a central office battery on said loop, a pair of oppositely-poled rectifier means, first means activated by said detector means detecting a first instantaneous polarity of said battery for inserting the output of one of said rectifier means in said loop to add to the potential of said battery, and second means activated by said detector means detecting a second instantaneous polarity of said battery for inserting the output of the other of said rectifier means in said loop to add to the potential of said battery, whereby said outputs and said battery increase the effective transmission range of said loop for both said first and second battery polarities.

6. An arrangement for increasing the effective transmission range of a telephone subscriber's loop in accordance with claim 5 wherein said detector means includes means for detecting the direction of current flow in said loop.

7. An arrangement for increasing the effective transmission range of a telephone subscriber's loop comprising detector means for detecting instantaneous polarities of a central office battery on said loop, means including a first transistor for inserting a first source of potential in said loop to add to the potential of said battery, said first transistor being turned on by said detector means during the interval that said detector means detects a first instantaneous polarity of said battery, and means including a second transistor turned on by said detector means during the interval that said detector means detects a second instantaneous polarity of said battery for inserting a second source of potential in said loop to add to the potential of said battery, whereby said first and second sources and said battery increase the effective transmission range of said loop for both said first and second battery polarities.

8. An arrangement for increasing the effective transmission range of a telephone subscriber's loop in accordance with claim 7 wherein said detector means includes means for retecting the direction of current flow in said loop.

9. An arrangement for increasing the effective transmission range of a telephone subscriber's loop connected to a central office battery (112) comprising means including a pair of anode-gate and gate-cathode paths (201, 202) of a plurality of silicon-controlled switches (203A, 204A, 205A, 206A, 203B, 204B, 205B, 206B) for detecting the instantaneous polarity of said battery, a capacitor (208A) serially inserted in said subscriber's loop, and means for charging said capacitor in accordance with the polarity determined by said detector means, said charging means including a pair of silicon-controlled switches (203A, 204A or 203B, 204B) whose anode-gate paths are included in said pair of anode-gate and gate-cathode paths, said pair of silicon-controlled switches having their anode-cathode paths arranged as an alternating-current rectifier to charge said capacitor to one polarity detected by said detecting means, said charging means further including another pair of silicon-controlled switches (205A, 206A or 205B, 206B) having their gate-cathode paths included in said pair of anode-gate and gate-cathode paths, the anode-cathode paths of said another pair of silicon-controlled switches being connected as an alternating-current switch being connected as an alternating-current rectifier circuit to charge said capacitor to the other polarity detected by said detecting means.

10. An arrangement for increasing the effective transmission range of a telephone subscriber's loop connected to a central office battery comprising a capacitor serially inserted in said loop, first rectifier means for charging said capacitor to a first polarity, second rectifier means for charging said capacitor to an opposite polarity, and detector means responsive to the instantaneous polarity of the central office battery for selectively enabling either said first or said second rectifier means, said detector means being arranged so as to enable the one of said rectifier means which will charge said capacitor so as to add to the potential applied to said loop by the central office battery.

11. An arrangement for increasing the effective transmission range of a telephone subscriber's loop connected to a central office battery in accordance with claim 10 wherein said detector means includes means for detecting the direction of current flow in said loop.

12. An arrangement for increasing the effective transmission range of a telephone subscriber's loop in a central office arranged for reverse-battery signaling comprising detector means responsive to instantaneous polarities of a central office battery on said loop, first transistor means activated by said detector means responsive to one instantaneous polarity of said battery for inserting a first source of potential in a first direction in said loop in series with said battery to add to the potential of said battery, and second transistor means activated by said detector means responsive to the reverse instantaneous polarity of said battery for inserting a second source of potential in a second direction in said loop in series with said battery to add to the potential of said battery, whereby said serially inserted sources and said battery increase the effective transmission range of said loop for both said one and said reverse-battery polarities.

13. An arrangement for increasing the effective transmission range of a telephone subscriber's loop connected to a central office battery in accordance with claim 12 wherein said detector means includes means for detecting the direction of current flow in said loop.

14. An arrangement for increasing the effective transmission range of a telephone subscriber's loop comprising a first pair of sources of potential each insertable in one of the loop conductors and poled so as to add to the potential of a first instantaneous polarity of a central office battery on said loop, a second pair of sources of potential each insertable in one of the loop conductors and poled oppositely to said first pair of sources so as to add to the potential of a second instantaneous polarity of said battery on said loop, detector means for detecting instantaneous polarities of said battery on said loop, first means activated by said detector means detecting said first instantaneous polarity of said battery for inserting said first pair of sources in said loop, and second means activated by said detecting means detecting said second instantaneous polarity of said battery for inserting said second pair of sources in said loop, whereby said first and second pairs of sources and said battery increases the effective transmission range of said loop for both said first and second battery polarities.

15. An arrangement for increasing the effective transmission range of a telephone subscriber's loop in accordance with claim 14 wherein said detector means includes means for detecting the direction of current flow in said loop.

References Cited

UNITED STATES PATENTS 2,055,647 9/1936 Bowne ______________ 179—27

KATHLEEN CLAFFY, Primary Examiner

J. S. BLACK, Assistant Examiner